United States Patent
Wang et al.

(10) Patent No.: US 11,928,842 B2
(45) Date of Patent: Mar. 12, 2024

(54) METHOD AND APPARATUS FOR MEASURING CHROMATICITY OF A TARGET OBJECT

(71) Applicant: NATIONAL CHUNG CHENG UNIVERSITY, Minsyong Township, Chiayi County (TW)

(72) Inventors: Hsiang-Chen Wang, Minsyong Township, Chiayi County (TW); Yu-Ming Tsao, Minsyong Township, Chiayi County (TW); Yu-Lin Liu, Minsyong Township, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 101 days.

(21) Appl. No.: 17/729,228

(22) Filed: Apr. 26, 2022

(65) Prior Publication Data

US 2023/0154049 A1 May 18, 2023

(30) Foreign Application Priority Data

Nov. 17, 2021 (TW) .................. 110142801

(51) Int. Cl.
*G06T 7/90* (2017.01)
*G06F 17/18* (2006.01)

(52) U.S. Cl.
CPC ............... *G06T 7/90* (2017.01); *G06F 17/18* (2013.01); *G06T 2207/10024* (2013.01); *G06T 2207/10036* (2013.01); *G06T 2207/20081* (2013.01)

(58) Field of Classification Search
CPC ............ G06T 7/90; G06T 2207/10024; G06T 2207/10036; G06T 2207/20081; G06T 2207/30121; G06F 17/18
See application file for complete search history.

(56) References Cited

U.S. PATENT DOCUMENTS

| 7,009,640 | B1 * | 3/2006 | Ishii | .......................... G06T 7/90 |
| | | | | 358/518 |
| 2006/0007239 | A1 * | 1/2006 | Harrison | .................. G09G 5/02 |
| | | | | 345/590 |

FOREIGN PATENT DOCUMENTS

| JP | 2008-175739 A | 7/2008 |
| JP | 2010-271246 A | 12/2010 |

(Continued)

OTHER PUBLICATIONS

Taiwan Patent Office Search Report for Application No. 110142801 dated Dec. 6, 2022, (2 pages including English translation).

(Continued)

*Primary Examiner* — Jitesh Patel
(74) *Attorney, Agent, or Firm* — Michael Best & Friedrich LLP

(57) ABSTRACT

A method of measuring chromaticity of a target object is implemented using a computer device that stores a plurality of light source spectrum datasets each associated with a specific object. The method includes: obtaining a captured color image of the target object; generating a spectral image based on the captured color image using a spectral transformation matrix; obtaining one of the plurality of light source spectrum datasets that is associated with the target object; and calculating a chromaticity dataset of the target object based on the spectral image and the one of the plurality of light source spectrum datasets.

8 Claims, 8 Drawing Sheets

(56) References Cited

FOREIGN PATENT DOCUMENTS

| | | |
|---|---|---|
| JP | 2015-132594 A | 7/2015 |
| JP | 2017-503168 A | 1/2017 |
| JP | 2018-120184 A | 8/2018 |
| JP | 2019-070648 A | 5/2019 |
| JP | 2022-022514 A | 2/2022 |
| JP | 2022-038102 A | 3/2022 |
| TW | 200532172 A | 10/2005 |
| TW | 201027050 A | 7/2010 |

OTHER PUBLICATIONS

Japanese Patent Office Action for Application No. 2022-076725 dated Jun. 20, 2023 (5 pages including English translation).

* cited by examiner

METHOD AND APPARATUS FOR MEASURING CHROMATICITY OF A TARGET OBJECT

CROSS-REFERENCE TO RELATED APPLICATION

This application claims priority of Taiwanese Patent Application No. 110142801, filed on Nov. 17, 2021.

FIELD

The disclosure relates to a method and an apparatus for measuring chromaticity of a target object based on spectral image processing.

BACKGROUND

In the field of displaying equipment such as light emitting diode (LED) display screen, liquid-crystal display (LCD) screen, etc., when a display screen is manufactured, typically a testing procedure is implemented to ensure the display screen functions as expected. The testing procedure typically involves using a testing apparatus, also known as a chromometer, to measure chromaticity exhibited by the display screen. The term "chromaticity" refers to an objective specification of the quality of color regardless of an associated luminance, and consists of two parameters: hue and colorfulness.

Taiwanese Patent Application Publication No. TW201441589A discloses a two-dimensional time sequence type chromometer inspection method. In measuring the chromaticity exhibited by the display screen, a light source is used to irradiate a surface of the display screen, and the chromometer is disposed in proximity to the surface of the display screen to receive light reflected from the surface of the display screen. The chromometer includes a filter that corresponds with tristimulus values of the International Commission on Illumination (CIE) 1931 color matching functions, a plurality of photosensitive elements that receive the light traveling through the filter, and a processor that is configured to calculate the corresponding chromaticity based on the light received by the photosensitive elements. Specifically, the filter is configured to allow light having the tristimulus values matching the colors which human eyes can perceive.

It is noted that in use, the filter and the photosensitive elements are placed in close proximity so as to measure the chromaticity. As a result, the chromometer is only capable of measuring a relatively small part of surface of the display screen at one time. As the size of displaying equipment is growing, a more efficient way of measuring chromaticity may be desired.

SUMMARY

One object of the disclosure is to provide a method for measuring chromaticity of a target object based on spectral image processing.

According to one embodiment of the disclosure, the method of measuring chromaticity of a target object is implemented using an apparatus that includes a processor and that stores a plurality of light source spectrum datasets each associated with a specific object. The method includes:

A) obtaining a captured color image of the target object;
B) generating a spectral image based on the captured color image using a spectral transformation matrix;
C) obtaining one of the plurality of light source spectrum datasets that is associated with the target object; and
D) calculating a chromaticity dataset of the target object based on the spectral image and the one of the plurality of light source spectrum datasets.

Another object of the disclosure is to provide an apparatus for measuring chromaticity of a target object based on spectral image processing.

According to one embodiment of the disclosure, the apparatus for measuring chromaticity of a target object includes:
a data storage that stores a plurality of light source spectrum datasets each associated with a specific object;
an image capturing unit; and a processor connected to the data storage medium and the image capturing unit, and is configured to
control the image capturing unit to obtain a captured color image of the target object,
generate a spectral image based on the captured color image using a spectral transformation matrix,
obtain one of the plurality of light source spectrum datasets that is associated with the target object; and
calculate a chromaticity dataset of the target object based on the spectral image and the one of the plurality of light source spectrum datasets.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
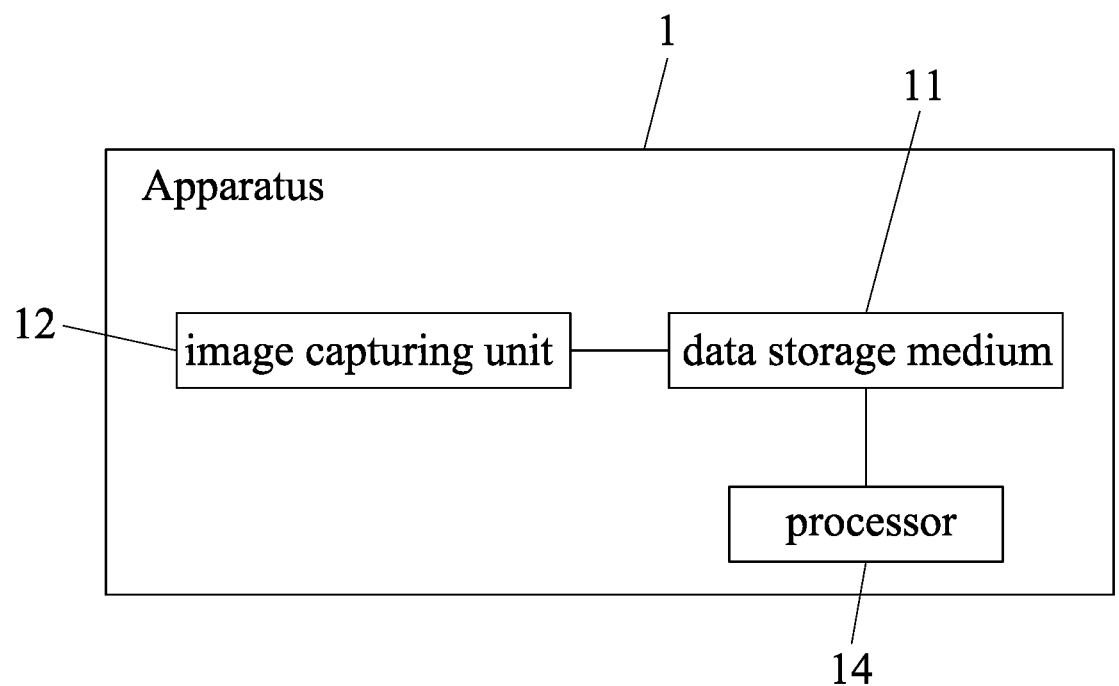
FIG. 1 is a block diagram illustrating an apparatus for measuring chromaticity of a target object according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" may refer to a direct connection among a plurality of electrical apparatus/devices/equipments via an electrically conductive material (e.g., an electrical wire), or an indirect connection between two electrical apparatus/devices/equipments via another one or more apparatus/devices/equipments, or wireless communication.

FIG. 1 is a block diagram illustrating an apparatus 1 for measuring chromaticity of a target object according to one embodiment of the disclosure. The apparatus 1 includes a data storage medium 11, an image capturing unit 12, and a processor 14 connected to the data storage medium 11 and the image capturing unit 12.

The processor 14 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or the like.

The data storage medium 11 is connected to the processor 14, and may be embodied using computer-readable storage medium such as hard disk drive(s), random access memory (RAM), read only memory (ROM), programmable ROM (PROM), firmware, flash memory, or combinations thereof, etc.

In this embodiment, the data storage medium 11 stores a software application program, a number (n) of training datasets, a plurality of light source spectrum datasets each associated with a specific object, a reference color image of a reference object, and a reflection spectral dataset associated with the reference object. The software application program includes instructions that, when executed by the processor 14, cause the processor 14 to perform a number of operations as described in the subsequent paragraphs.

The reference object may be X-Rite ColorChecker® Classic, which includes twenty-four color squares with twenty-four common natural colors (e.g., blue, green, red, grey), respectively. The reference color image may be captured using a camera, and may be in the form of an 8-bit color image expressed using a standard red, green, blue (sRGB) color space. In some embodiments, the reference color image and the training color images are captured using the same camera. The reflection spectral dataset may include spectral data (spectrum) of light reflected by the reference object, measured by, for example, a spectrometer, may correspond to wavelengths ranging from 380 to 780 nm, and may have a spectral resolution of 1 nm. In some embodiments, the reflection spectral dataset may be obtained from the public resource provided by the Munsell Color Science Laboratory of Rochester Institute of Technology (RIT).

In this embodiment, the light source spectrum datasets are associated with a number of specific objects, respectively. The number of specific objects may be light-emitting diode (LED) products manufactured by different manufacturers.

The image capturing unit 12 may be embodied using a camera with the specifications as follows: an image resolution of about 20 megapixels (5472*3648 pixels), a pixel density of 100 pixels per centimeter (PPCM), and a field of view (FOV) of 547.2*364.8 millimeters.

It is noted that in various embodiments, other cameras with different specifications may also be employed.

In use, an environment for operation of the image capturing unit 12 may be set as follows: firstly, a white balance point is set using a gray card (e.g., a 18% gray card) and a halogen lightbulb for irradiation; then the image capturing unit 12 is used to capture a surface with the highest light intensity, and an associated gray scale value that is associated with the surface is adjusted to a specific value (e.g., about 220). Afterward, when it is intended to capture an image using the image capturing unit 12, the same condition as above is employed. It is noted that other environments may be utilized in different embodiments, and is not limited as described above.

In some embodiments of the disclosure, a method for measuring chromaticity of a target object based on spectral image processing may include a matrix calculating process and a chromaticity measuring process.

Figure 2:
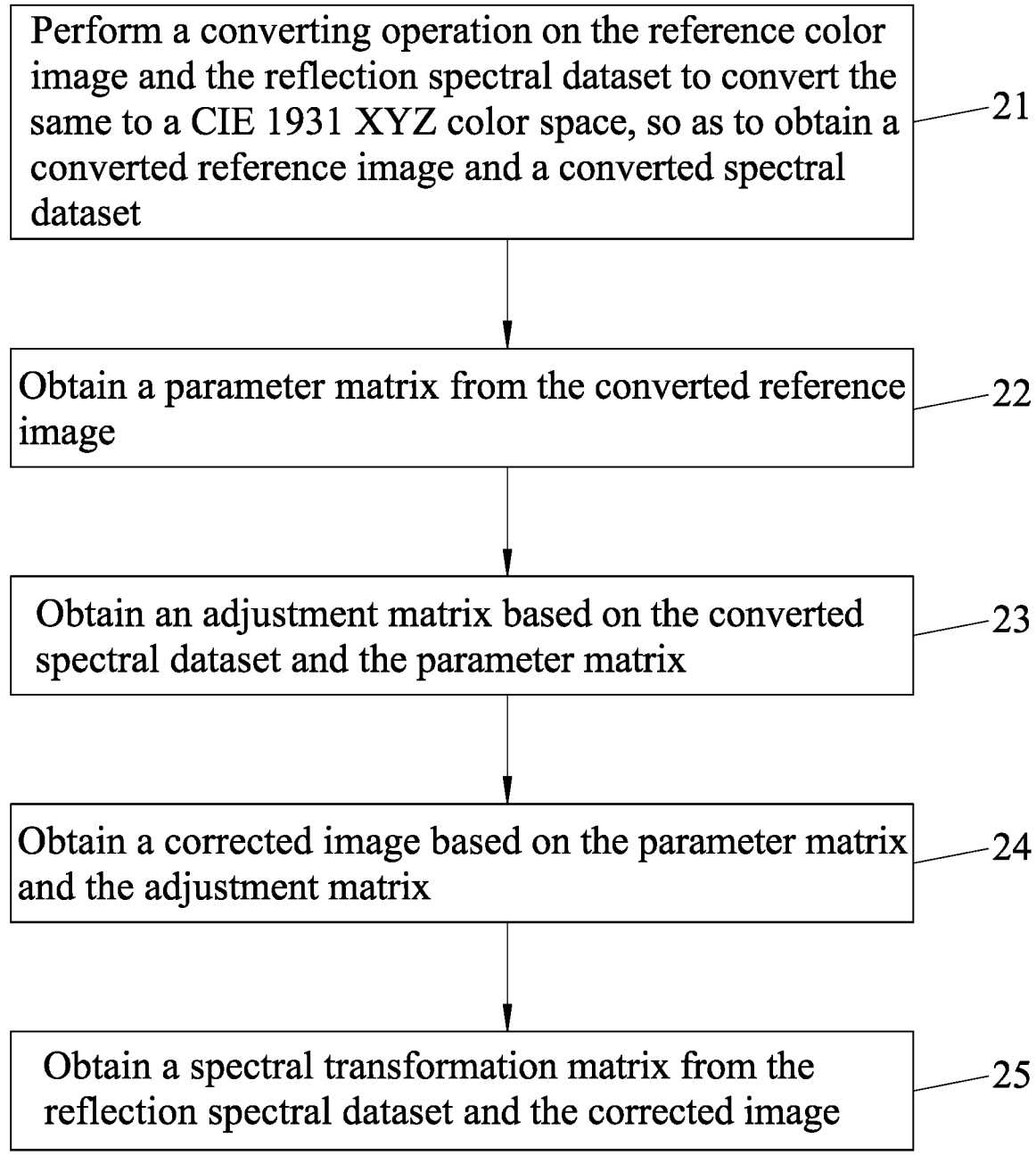
FIG. 2 is a flow chart illustrating steps of a matrix calculating process according to one embodiment of the disclosure.

FIG. 2 is a flow chart illustrating steps of the matrix calculating process according to one embodiment of the disclosure. The matrix calculating process may be implemented by the processor 14 executing the software application program.

In step 21, the processor 14 performs a converting operation on the reference color image and the reflection spectral dataset to convert the same to a CIE 1931 XYZ color space created by the International Commission on Illumination (CIE) in 1931, so as to obtain a converted reference image and a converted spectral dataset corresponding to the reference color image and the reflection spectral dataset, respectively.

Specifically, the converting operation includes, with respect to the reference color image, obtaining the converted reference image using the following equations:

$$\begin{bmatrix} X_C \\ Y_C \\ Z_C \end{bmatrix} = [M_A][T] \begin{bmatrix} f(R_{sRGB}) \\ f(G_{sRGB}) \\ f(B_{sRGB}) \end{bmatrix} \times 100, 0 \le \begin{matrix} R_{sRGB} \\ G_{sRGB} \\ B_{sRGB} \end{matrix} \le 1;$$

$$T = \begin{bmatrix} 0.4104 & 0.3576 & 0.1805 \\ 0.2126 & 0.7152 & 0.0722 \\ 0.0193 & 0.1192 & 0.9505 \end{bmatrix};$$

$$f(n) = \begin{cases} \left(\dfrac{n+0.055}{1.055}\right)^{2.4}, & n > 0.04045 \\ \left(\dfrac{n}{12.92}\right), & \text{otherwise} \end{cases} ; \text{ and}$$

$$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix},$$

where $X_C$, $Y_C$ and $Z_C$ represent an X value, a Y value and a Z value of a pixel of the converted reference image in the CIE 1931 XYZ color space; $R_{sRGB}$, $G_{sRGB}$ and $B_{sRGB}$ represent a red value, a green value and a blue value of a pixel of the reference color image in the sRGB color space, wherein said pixel of the reference color image corresponds to the pixel of the converted reference image; $X_{CW}$, $Y_{CW}$ and $Z_{CW}$ represent a red value, a green value and a blue value of a white point that defines the white color in the sRGB color space and that is captured under the CIE standard illuminant D65); $X_{SW}$, $Y_{SW}$ and $Z_{SW}$ represent a white point for an environmental illuminant under which the reference color image was captured; and $[M_A]$ represents a chromatic adaptation matrix. The white point is a set of tristimulus values or a set of chromaticity coordinates.

It is noted that, since the environmental illuminant used for capturing the reference color image may be one other than the standard illuminant in the sRGB color space, the chromatic adaptation matrix $[M_A]$ is employed for converting the white point for the standard illuminant to a corresponding white point for the environmental illuminant of the reference color image.

The converting operation also includes, with respect to the reflection spectral dataset, obtaining the converted spectral dataset using the following equations:

$$X_S = k\int_{380\,nm}^{780\,nm} S(\lambda)R(\lambda)\bar{x}(\lambda)d\lambda;$$

$$Y_S = k\int_{380\,nm}^{780\,nm} S(\lambda)R(\lambda)\bar{y}(\lambda)d\lambda;$$

$$Z_S = k\int_{380\,nm}^{780\,nm} S(\lambda)R(\lambda)\bar{z}(\lambda)d\lambda;\text{ and}$$

$$k = 100/\int_{380\,nm}^{780\,nm} S(\lambda)\bar{y}(\lambda)d\lambda,$$

where, for each wavelength λ of the spectrum of the reflection spectral dataset (having a range between 380 to 780 nanometers), $X_S$, $Y_S$ and $Z_S$ represent an X value, a Y value and a Z value of the converted spectral dataset in the CIE 1931 XYZ color space for the spectral value corresponding to the wavelength λ of the spectrum of the reflection spectral dataset, S(λ) represents a spectral value corresponding to the wavelength λ in a spectrum of the environmental illuminant under which the reference color image was captured, R(λ) represents the spectral value corresponding to the wavelength λ of the spectrum of the reflection spectral dataset of the reference object, and $\bar{x}(\lambda)$, $\bar{y}(\lambda)$ and $\bar{z}(\lambda)$ represent color matching functions of the CIE 1931 XYZ color space.

It is noted that the converting operation as described above is performed in a pixel-to-pixel basis.

In step 22, the processor 14 obtains a parameter matrix from the converted reference image that is obtained in step 21.

Specifically, the parameter matrix is used to correct errors attributed to a number of factors that are associated with the camera used to capture the reference color image. In this embodiment, the factors involved include a non-linear response of the camera, a dark current associated with the camera, a deviation of a color filter of the camera, and a color shift of the camera (e.g., white balance (WB)). One or more matrices may be used to express correction parameters for correcting one or more of the above mentioned factors. Afterward, the parameter matrix may be obtained based on the one or more matrices for the above mentioned factors.

In this embodiment, a first matrix for the non-linear response of the camera may be expressed as $$V_{Non-linear} = [X_C^3\ Y_C^3\ Z_C^3\ X_C^2\ Y_C^2\ Z_C^2\ X_C\ Y_C\ Z_C\ 1]^T$$

A second matrix for the dark current associated with the camera may be expressed as $V_{Dark} = [a]$, where a is a constant representing the dark current, which is typically constant.

A third matrix for the deviation of the color filter of the camera and the color shift of the camera may be expressed as $$V_{Color} = [X_C Y_C Z_C\ X_C Y_C\ X_C Z_C\ Y_C Z_C\ X_C\ Y_C\ Z_C]^T,$$

where, since the reference color image has been converted to the CIE 1931 XYZ color space, the X, Y and Z values, namely $X_C$, $Y_C$ and $Z_C$, of the pixel of the converted reference image are considered.

Using the above first to third matrices, the parameter matrix is represented by:

$$V = [X_C^3\ Y_C^3\ Z_C^3\ X_C^2\ Y_C\ X_C^2\ Z_C\ Y_C^2\ Z_C\ X_C\ Y_C^2\ X_C Z_C^2\ Y_C Z_C^2\ X_C Y_C Z_C X_C^2\ Y_C^2\ Z_C^2\ X_C Y_C X_C Z_C Y_C Z_C X_C Y_C Z_C a]^T.$$

In step 23, the processor 14 obtains an adjustment matrix based on the converted spectral dataset and the parameter matrix. Specifically, the adjustment matrix [C] is obtained by performing multiple regression analysis based on the following equation:

$$C = [XYZ_{Spectrum}] \times \text{pinv}([V])$$

where $[XYZ_{spectrum}]$ is a matrix containing the X, Y and Z values of the converted spectral dataset in the CIE 1931 XYZ color space, [V] is the parameter matrix, and pinv([V]) represents an inverse matrix of the parameter matrix.

In step 24, the processor 14 obtains a corrected image based on the parameter matrix and the adjustment matrix. Specifically, the processor 14 obtains the corrected image using the following equation:

$$[XYZ_{Correct}] = [C] \times [V]$$

where $[XYZ_{Correct}]$ is a matrix containing X values, Y values and Z values of all pixels of the corrected image in the CIE 1931 XYZ color space. Using the above operation, the pixel values of the pixels that constitute the corrected image may be obtained, and the processor 14 is programmed to generate the corrected image accordingly.

Figure 3:
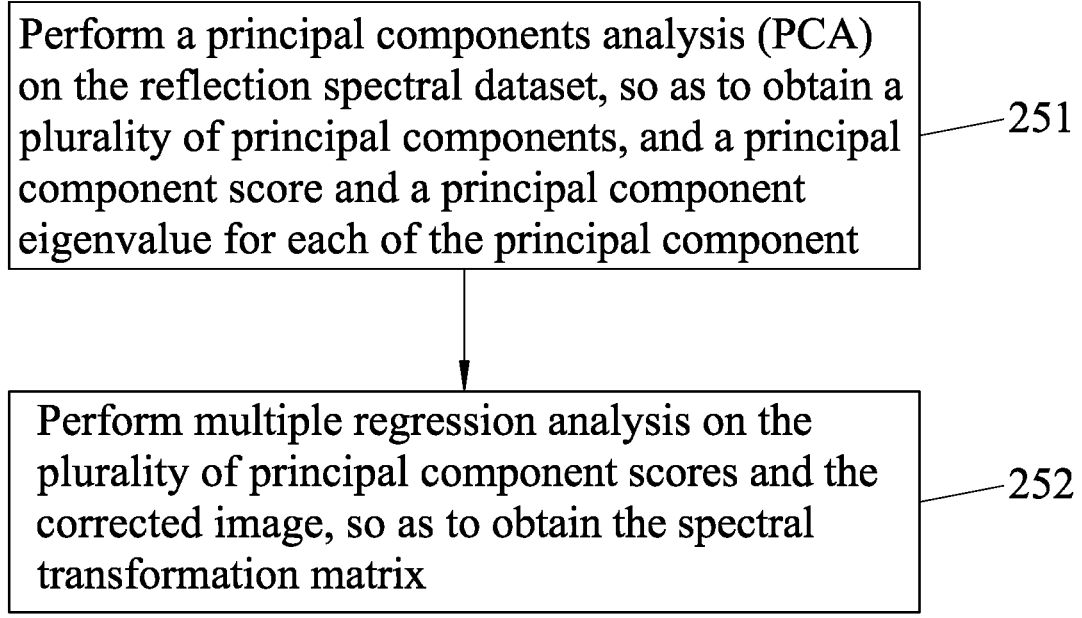
FIG. 3 is a flow chart illustrating sub-steps of operations for obtaining a spectral transformation matrix according to one embodiment of the disclosure.

In step 25, the processor 14 obtains a spectral transformation matrix from the reflection spectral dataset and the corrected image. Specifically, FIG. 3 is a flow chart illustrating sub-steps of operations in step 25 according to one embodiment of the disclosure.

In sub-step 251, the processor 14 performs a principal components analysis (PCA) on the reflection spectral dataset, so as to obtain a plurality of principal components, and obtain, for each of the principal components a principal component score and a principal component eigenvalue of the principal component. In this embodiment, twelve principal component scores and twelve principal component eigenvalues of twelve principal components are obtained, as these principal component scores and principal component eigenvalues are capable of explaining 99.9964854% of variance within the reflection spectral dataset, but other numbers of principal component scores and principal component eigenvalues may be employed in other embodiments.

In sub-step 252, the processor 14 performs multiple regression analysis on the plurality of principal component scores and the corrected image, so as to obtain the spectral transformation matrix.

Specifically, the operation of sub-step 252 includes using the following equation to obtain the spectral transformation matrix M:

$$M = [\text{Score}] \times \text{pinv}([V'_{Color}])$$

where [Score] is a matrix that contains the plurality of principal component scores, $[V'_{Color}] = [X'_C Y'_C Z'_C\ X'_C Y'_C\ X'_C Z'_C\ Y'_C Z'_C\ X'_C\ Y'_C\ Z'_C]^T$, and $X'_C$, $Y'_C$ and $Z'_C$ represent an X value, a Y value and a Z value of a pixel of the corrected image in the CIE 1931 XYZ color space.

With the spectral transformation matrix, it is then possible to perform the measuring of the chromaticity of a target object, employing the spectral transformation matrix.

Figure 4:
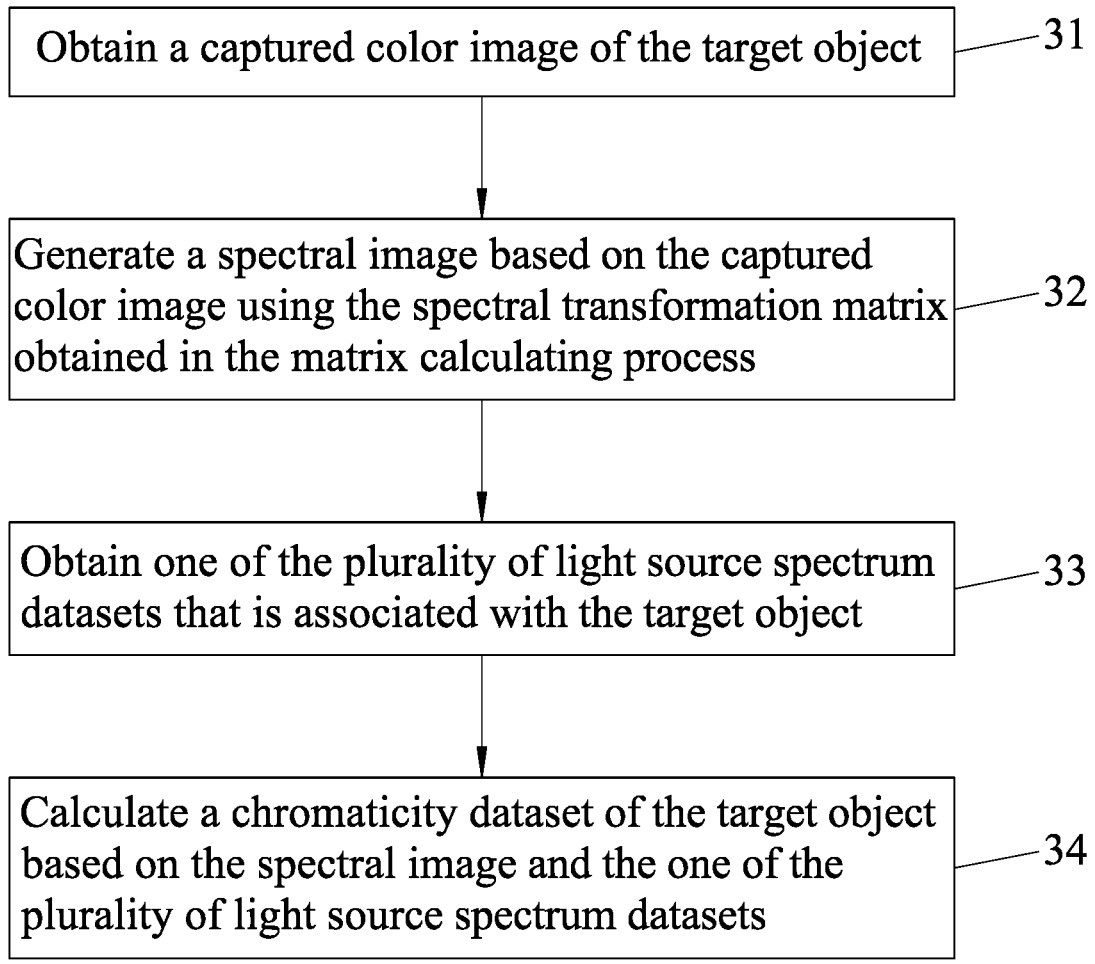
FIG. 4 is a flow chart illustrating steps of a chromaticity measuring process according to one embodiment of the disclosure.

FIG. 4 is a flow chart illustrating steps of the chromaticity measuring process according to one embodiment of the disclosure. In this embodiment, the chromaticity measuring process is implemented using the processor 14 executing the software application program.

In step 31, the image capturing unit 12 is configured to obtain a captured color image of the target object. In this embodiment, the target object may be a display device (e.g., an LED display, an organic LED (OLED) display, or other commercially available display devices), and the captured color image contains a part of a surface of the display device. The captured color image is then stored in the data storage medium 11.

In step 32, the processor 14 obtains the captured color image from the data storage medium 11, and generates a spectral image based on the captured color image using the spectral transformation matrix obtained in the matrix calculating process.

Figure 5:
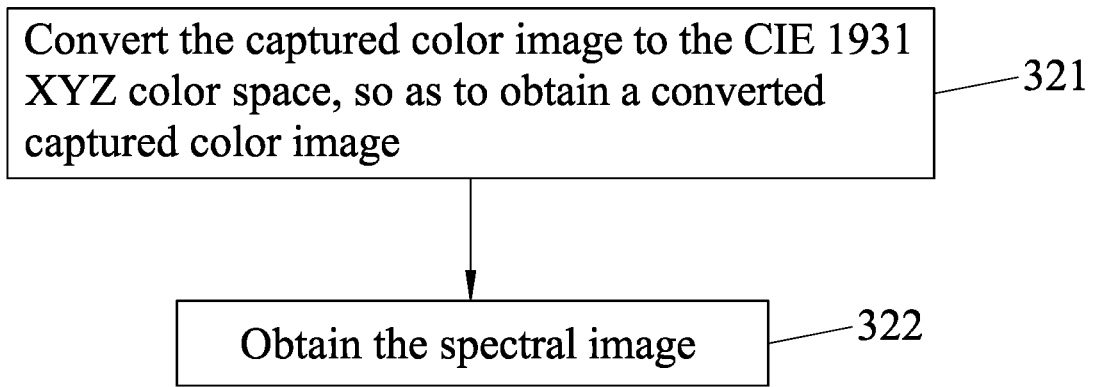
FIG. 5 is a flow chart illustrating sub-steps of operations of generating a spectral image according to one embodiment of the disclosure.

Specifically, FIG. 5 is a flow chart illustrating sub-steps of operations in step 32 according to one embodiment of the disclosure.

In sub-step 321, the processor 14 converts the captured color image to the CIE 1931 XYZ color space, so as to obtain a converted captured color image. The operations of sub-step 321 may be done in a manner similar to those of step 21, and details thereof are omitted herein for the sake of brevity.

In sub-step 322, the processor 14 obtains the spectral image using the following equation:

$$[S_{Spectrum}]=[EV][M][V''_{Color}]$$

where $[S_{Spectrum}]$ is a matrix containing an X value, a Y value and a Z value of a pixel of the spectral image in the CIE 1931 XYZ color space, [M] is the spectral transformation matrix, [EV] represents the principal component eigenvalues, and $$[V'_{Color}]=[X_T Y_T Z_T X_T Y_T X_T Z_T Y_T Z_T X_T Y_T Z_T]^T$$

where $X_T$, $Y_T$ and $Z_T$ represent an X value, a Y value and a Z value of a pixel of the converted original image in the CIE 1931 XYZ color space, respectively.

After step 32, the spectral image that corresponds with the captured color image and that is in the CIE 1931 XYZ color space is generated.

In step 33, the processor 14 obtains one of the plurality of light source spectrum datasets that is associated with the target object.

Specifically, in this embodiment, the light source spectrum datasets are associated with the LED products manufactured by various manufacturers. The target object may be a display device manufactured by one specific manufacturer, and one of the light source spectrum datasets that is associated with the LED product manufactured by the one specific manufacturer may be obtained. Such an operation may be done by a user manually selecting one of the light source spectrum datasets.

Then, in step 34, the processor 14 calculates a chromaticity dataset of the target object based on the spectral image and the one of the plurality of light source spectrum datasets that is obtained in step 33.

Figure 6:
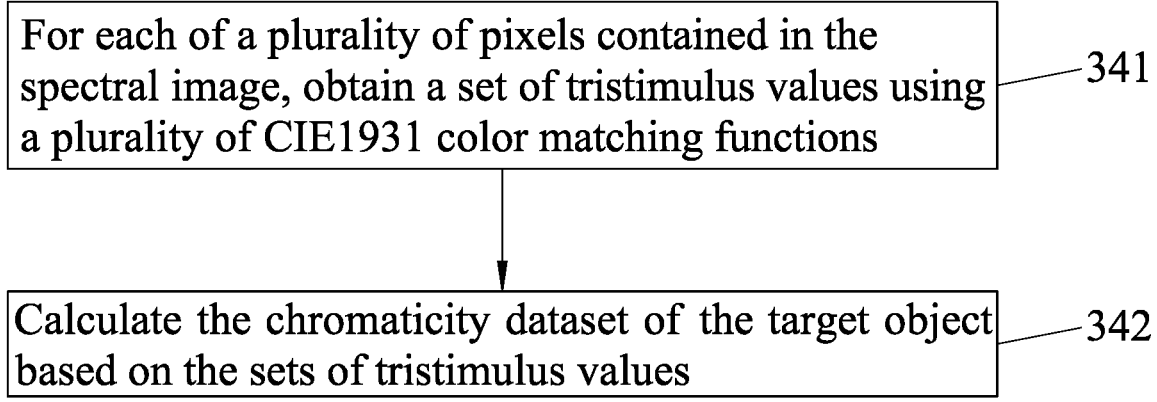
FIG. 6 is a flow chart illustrating sub-steps of operations of calculating a chromaticity dataset of the target object according to one embodiment of the disclosure.

Specifically, FIG. 6 is a flow chart illustrating sub-steps of operations in step 34 according to one embodiment of the disclosure.

In sub-step 341, for each of a plurality of pixels contained in the spectral image, the processor 14 obtains a set of tristimulus values using a plurality of CIE1931 color matching functions.

The set of tristimulus values (X, Y, Z) is calculated by:

$$X=\int_0^\infty I(\lambda)\bar{x}(\lambda)d\lambda$$

$$Y=\int_0^\infty I(\lambda)\bar{y}(\lambda)d\lambda$$

$$Z=\int_0^\infty I(\lambda)\bar{z}(\lambda)d\lambda$$

where $I(\lambda)$ represents the one of the plurality of light source spectrum datasets, and $\bar{x}(\lambda)$, $\bar{y}(\lambda)$ and $\bar{z}(\lambda)$ represent different CIE1931 color matching functions.

In sub-step 342, the processor 14 calculates the chromaticity dataset of the target object based on the sets of tristimulus values.

Specifically, the chromaticity dataset of the target object includes, for each of the pixels, a set of chromaticity coordinates (x, y) that is calculated by:

$$x=\frac{X}{X+Y+Z}, \text{ and}$$

$$y=\frac{Y}{X+Y+Z}.$$

In this manner, the chromaticity dataset of the target object may be calculated, thus completing the measuring of the chromaticity of the target object.

Figure 7:
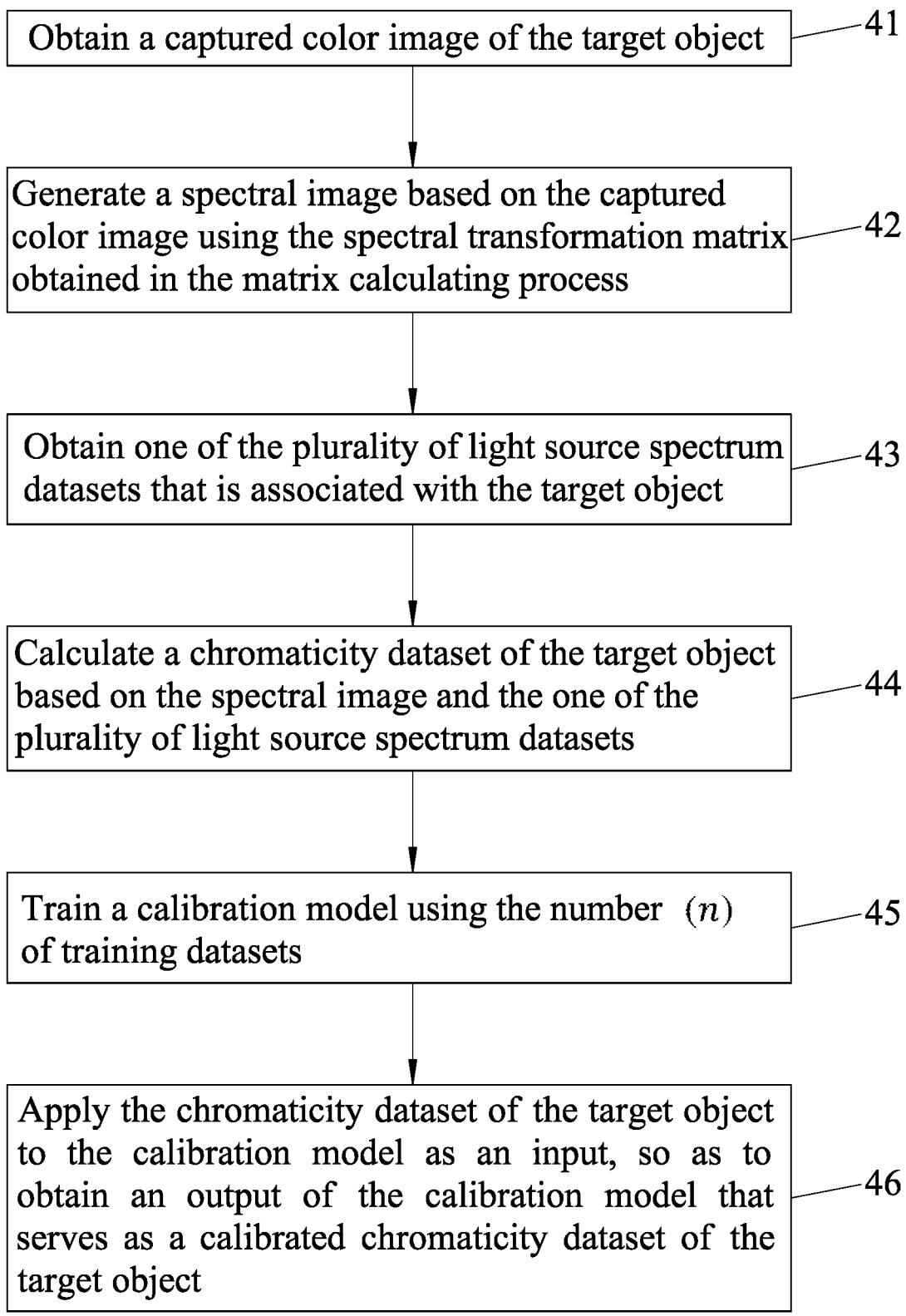
FIG. 7 is a flow chart illustrating steps of another chromaticity measuring process according to one embodiment of the disclosure.

FIG. 7 is a flow chart illustrating steps of another chromaticity measuring process according to one embodiment of the disclosure. In this embodiment, the chromaticity measuring process is implemented using the processor 14 executing the software application program.

In this embodiment, the chromaticity measuring process includes steps 41 to 46. Specifically, the operations of steps 41 to 44 are similar to those of steps 31 to 34, respectively.

After the chromaticity dataset of the target object is calculated in step 44, the flow proceeds to step 45, in which the processor 14 trains a calibration model using the number (n) of training datasets.

Specifically, each of the training datasets includes an expected chromaticity dataset and a measured chromaticity dataset. In this embodiment, each of the training datasets may be associated with one specific object (e.g., a color image), and the expected chromaticity dataset may be measured by operating a CA-310 color analyzer to obtain accurate measurement reading of the chromaticity of the specific object (hence, when the same specific object is measured using the above chromaticity measuring process, the "expected" values are expected to be as close to the readings of the CA-310 color analyzer as possible), or obtained using other manners that yield accurate measurement reading of the chromaticity of the specific object. The measured chromaticity dataset may be obtained using the above chromaticity measuring process, and may be less accurate than the expected chromaticity dataset. As such, it may be beneficial to determine a relation between the expected chromaticity dataset and the measured chromaticity dataset, and to calibrate the measured chromaticity dataset calculated afterwards so as to obtain a more accurate result.

In this embodiment, the calibration model is a linear regression model that expresses a relation between the expected chromaticity dataset and the measured chromaticity dataset, and may be expressed by $$Y_i=\beta_0+\beta_1 X_i+\varepsilon_i, i=1,2,\ldots,n,$$

where $Y_i$ represents the expected chromaticity dataset of an $i^{th}$ one of the training datasets, $X_i$ represents the measured chromaticity dataset of the $i^{th}$ one of the training datasets, $\beta_0$ and $\beta_i$ represent coefficients of the calibration model that are to be trained, and $\varepsilon_i$ represents an error term associated with the $i^{th}$ one of the training datasets.

By processing the number (n) of training datasets, the coefficients of the calibration model $\beta_0$ and $\beta_i$ and the error term associated with the $i^{th}$ one of the training datasets $\varepsilon_i$ may be obtained. It is noted that since the generation of the linear regression model is readily available in the related art, details thereof are omitted herein for the sake of brevity.

Afterward, when another chromaticity dataset measured using the above chromaticity measuring process is obtained, the calibration model may be used to calibrate the measured chromaticity dataset to obtain a more accurate result.

In step 46, the processor 14 applies the chromaticity dataset of the target object to the calibration model as an input, so as to obtain an output of the calibration model that serves as a calibrated chromaticity dataset of the target object. This calibrated chromaticity dataset may be a more accurate representation of the chromaticity of the target object.

It is noted that while in this embodiment, the operations of step 45 are performed after step 44, in other embodiments, the operations of step 45 may be performed at various stages of the chromaticity measuring process prior to step 46.

Figure 8:
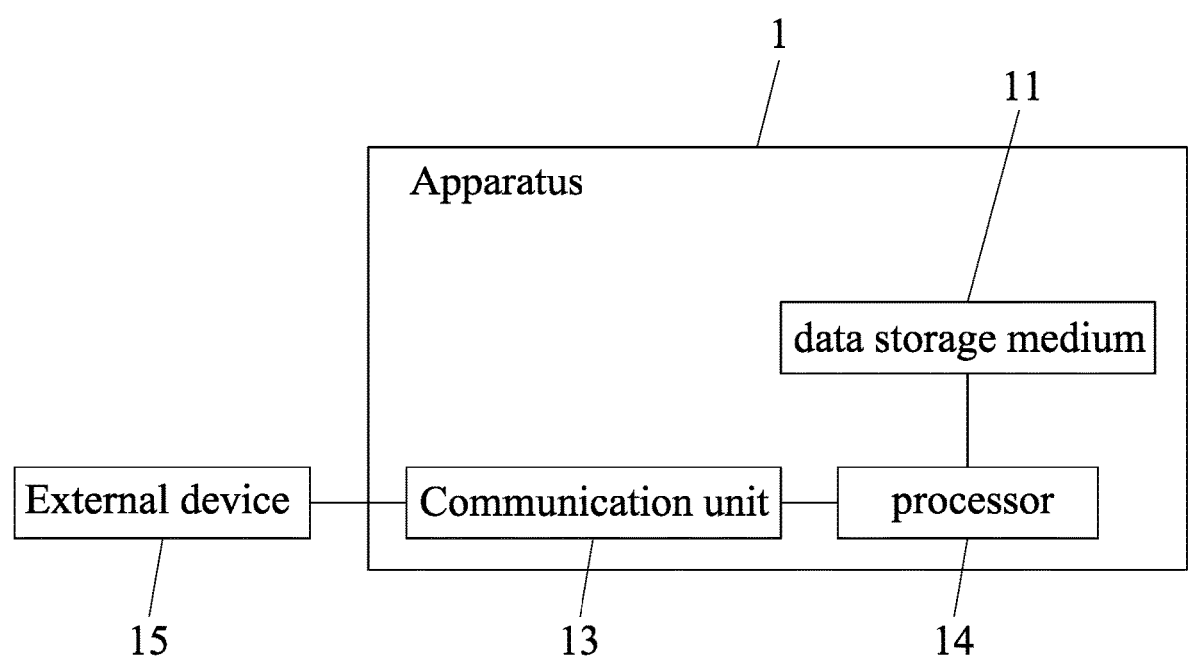
FIG. 8 is a block diagram of an apparatus for measuring chromaticity of a target object according to one embodiment of the disclosure.

According to one embodiment of the disclosure, there is provided an apparatus for measuring chromaticity of a target object. FIG. 8 is a block diagram of an apparatus 1 for measuring chromaticity of a target object according to one embodiment of the disclosure. In this embodiment, the apparatus 1 includes a data storage medium 11, a communication unit 13, and a processor 14 connected to the data storage medium 11 and the communication unit 13. The data storage medium 11 and the processor 14 of the apparatus of FIG. 8 are similar to those described with reference to FIG. 1.

The communication unit 13 may include at least one of a radio-frequency integrated circuit (RFIC), a short-range wireless communication module supporting a short-range wireless communication network using a wireless technology of Bluetooth® and/or Wi-Fi, etc., a mobile communication module supporting telecommunication using Long-Term Evolution (LTE), the third generation (3G) and/or fifth generation (5G) of wireless mobile telecommunications technology, and/or the like.

In this embodiment, the operations of step 31 of the chromaticity measuring process may be omitted, and operations of step 32 of the chromaticity measuring process are performed by the processor 14 controlling the communication unit 13 to establish a connection with an external device 15 (e.g., an image capturing unit, a server, a personal computer, a laptop, a tablet, a portable electronic device, etc.) and to obtain the captured color image of the target object therefrom, and then, the spectral image may be generated.

To sum up, embodiments of the disclosure provide a method and an apparatus for measuring chromaticity of a target object based on spectral image processing. In the method, a matrix calculating process is implemented to extract the accurate spectral information (e.g., the principle component scores, the principle component eigenvalues, etc.) from the reference object (e.g., a number of LED products) in the CIE 1931 XYZ color space. Also, various parameters that may cause errors in subsequent estimations are also adjusted in the spectral transformation matrix.

Afterward, the chromaticity measuring estimating process is performed by first transforming the captured color image of the target object to the spectral image using the spectral transformation matrix, and obtaining one of a plurality of light source spectrum datasets that is associated with the target object, and then calculating a chromaticity dataset of the target object based on the spectral image and the one of the plurality of light source spectrum datasets.

In some embodiments, after having been calculated, the chromaticity dataset of the target object may be applied to the calibration model as an input, so as to obtain an output of the calibration model as a calibrated chromaticity dataset of the target object, which may be a more accurate representation of the chromaticity of the target object.

As such, using a captured color image of a target object, the chromaticity measuring estimating process of this disclosure may be performed with respect to a larger FOV, which is more efficient than the prior art.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of measuring chromaticity of a target object, the method being implemented using an apparatus that includes a processor and that stores a plurality of light source spectrum datasets each associated with a specific object, and comprising steps of:
   A) obtaining a captured color image of the target object;
   B) generating a spectral image based on the captured color image using a spectral transformation matrix;
   C) obtaining one of the plurality of light source spectrum datasets that is associated with the target object; and
   D) calculating a chromaticity dataset of the target object based on the spectral image and the one of the plurality of light source spectrum datasets;
   wherein step D) includes sub-steps of:
   D1) for each of a plurality of pixels contained in the spectral image, obtaining a set of tristimulus values using a plurality of color matching functions of the CIE 1931 XYZ color space; and
   D2) calculating the chromaticity dataset of the target object based on the sets of tri stimulus values respectively obtained for the pixels contained in the spectral image.

2. The method of claim 1, the apparatus further storing a calibration model, the method further comprising, after step D):
   E) applying the chromaticity dataset of the target object to the calibration model as an input, so as to obtain an output of the calibration model that serves as a calibrated chromaticity dataset of the target object.

3. The method of claim 2, the apparatus further storing a number (n) of training datasets, each of the training datasets including an expected chromaticity dataset and a measured chromaticity dataset, the method further comprising, prior to step E):
   training the calibration model using the number (n) of training datasets, the calibration model being a linear regression model that is expressed by $$Y_i = \beta_0 + \beta_1 X_i + \varepsilon_i, i=1,2,\ldots,n,$$

where $Y_i$ represents the expected chromaticity dataset of an $i^{th}$ one of the training datasets, $X_i$ represents the measured chromaticity dataset of the $i^{th}$ one of the training datasets, $\beta_0$ and $\beta_i$ represent coefficients of the calibration model that are to be trained, and $\varepsilon_i$ represents an error term associated with the $i^{th}$ one of the training datasets.

4. The method of claim 1, wherein:
in sub-step D1), the set of tristimulus values (X, Y, Z) is calculated by:

$$X=\int_0^\infty I(\lambda)\bar{x}(\lambda)d\lambda$$

$$Y=\int_0^\infty I(\lambda)\bar{y}(\lambda)d\lambda$$

$$Z=\int_0^\infty I(\lambda)\bar{z}(\lambda)d\lambda$$

where $I(\lambda)$ represents the one of the plurality of light source spectrum datasets, $\bar{x}(\lambda)$, $\bar{y}(\lambda)$ and $\bar{z}(\lambda)$ represent the color matching functions of the CIE 1931 XYZ color space;
  the chromaticity dataset of the target object includes, for each of the pixels, a set of chromaticity coordinates; and
in sub-step D2), the set of chromaticity coordinates (x,y) for each of the pixels is calculated by $$x = \frac{X}{X+Y+Z}, \text{ and}$$

$$y = \frac{Y}{X+Y+Z}.$$

5. An apparatus for measuring chromaticity of a target object, comprising:
  a data storage medium that stores a plurality of light source spectrum datasets each associated with a specific object;
  an image capturing unit; and
  a processor connected to said data storage medium and said image capturing unit, and configured to
  control said image capturing unit to obtain a captured color image of the target object,
  generate a spectral image based on the captured color image using a spectral transformation matrix,
  obtain one of the plurality of light source spectrum datasets that is associated with the target object, and
  calculate a chromaticity dataset of the target object based on the spectral image and the one of the plurality of light source spectrum datasets;
  wherein said processor is further configured to calculate the chromaticity dataset of the target object by:
  for each of a plurality of pixels contained in the spectral image, obtaining a set of tristimulus values using a plurality of color matching functions of the CIE 1931 XYZ color space; and
  calculating the chromaticity dataset of the target object based on the sets of tristimulus values respectively obtained for the pixels contained in the spectral image.

6. The apparatus of claim 5, wherein said data storage medium further stores a calibration model, and said processor is further configured to apply the chromaticity dataset of the target object to the calibration model as an input, so as to obtain an output of the calibration model that serves as a calibrated chromaticity dataset of the target object.

7. The apparatus of claim 6, wherein said data storage medium further stores a number (n) of training datasets, each of the training datasets including an expected chromaticity dataset and a measured chromaticity dataset, and said processor is further configured to, prior to apply the chromaticity dataset to the calibration model:
  train the calibration model using the number (n) of training datasets, the calibration model being a linear regression model that is expressed by $$Y_i=\beta_0+\beta_1 X_i+\varepsilon_i, i=1,2,\ldots,n,$$

where $Y_i$ represents the expected chromaticity dataset of an $i^{th}$ one of the training datasets, $X_i$ represents the measured chromaticity dataset of the $i^{th}$ one of the training datasets, $\beta_0$ and $\beta_i$ represent coefficients of the calibration model that are to be trained, and $\varepsilon_i$ represents an error term associated with the $i^{th}$ one of the training datasets.

8. The apparatus of claim 5, wherein the chromaticity dataset of the target object includes, for each of the pixels, a set of chromaticity coordinates, and said processor is configured to:
  calculate the set of tristimulus values (X, Y, Z) by $$X=\int_0^\infty I(\lambda)\bar{x}(\lambda)d\lambda$$

$$Y=\int_0^\infty I(\lambda)\bar{y}(\lambda)d\lambda$$

$$Z=\int_0^\infty I(\lambda)\bar{z}(\lambda)d\lambda$$

where $I(\lambda)$ represents the one of the plurality of light source spectrum datasets, $\bar{x}(\lambda)$, $\bar{y}(\lambda)$ and $\bar{z}(\lambda)$ represent the color matching functions of the CIE 1931 XYZ color space;
  calculate the set of chromaticity coordinates (x, y) for each of the pixels is by $$x = \frac{X}{X+Y+Z}, \text{ and}$$

$$y = \frac{Y}{X+Y+Z}.$$

* * * * *